1,915,936

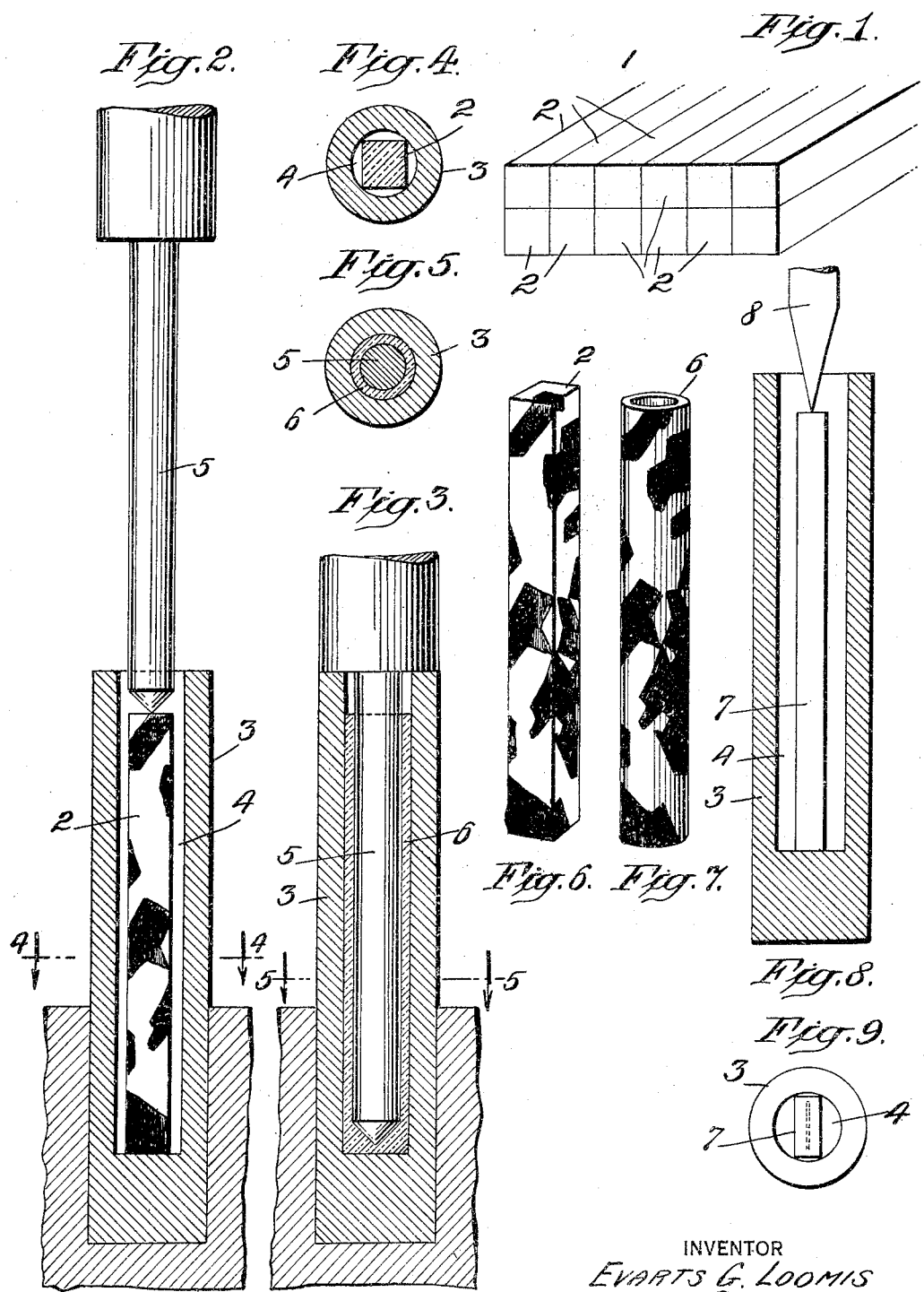
June 27, 1933.  E. G. LOOMIS  1,915,936
METHOD FOR SHAPING CELLULOID ARTICLES
Filed Aug. 13, 1930
INVENTOR
EVARTS G. LOOMIS
ATTORNEY Patented June 27, 1933

UNITED STATES PATENT OFFICE

EVARTS G. LOOMIS, OF NEWARK, NEW JERSEY, ASSIGNOR TO EVARTS G. LOOMIS COMPANY, OF NEWARK, NEW JERSEY, A CORPORATION OF NEW JERSEY

METHOD FOR SHAPING CELLULOID ARTICLES

Application filed August 13, 1930. Serial No. 475,071.

Celluloid is a valuable substance when suitable for fountain pens, pencils and similar uses, such celluloid with mottled effects being worth about $4.00 a pound. Heretofore this celluloid has been made into tubular articles through turning and drilling methods which have caused a large waste of material. The object of my invention is to dispense with both turning and drilling whereby all material is saved that has heretofore been lost and at the same time to shape the article without interfering with the mottled effect. This and other objects are accomplished by my invention, some embodiments of which are hereinafter more particularly set forth.

For a more detailed description of my invention, reference is to be had to the accompanying drawing, forming a part hereof, in which Figure 1 shows a block of celluloid of similar material suitable for sub-division as indicated by the lines, so that a number of prisms are formed which may be shaped into tubular articles, as hereinafter set forth;

Figure 2 is a side elevation, partially in section, of one of these prisms about to be shaped;

Figure 3 shows the apparatus of Figure 2 with the article shaped;

Figures 4 and 5 are sectional views taken on the lines 4—4 of Figure 2 and 5—5 of Figure 3, respectively, looking in the direction of the arrows;

Figures 6 and 7 show a celluloid blank and the finished tube respectively, the mottled effect not being distorted by the operation of the apparatus herein disclosed;

Figures 8 and 9 show a modification, Figure 8 being a longitudinal section and Figure 9 a plan view thereof.

Throughout the various views of the drawing, similar reference characters designate similar parts.

A block 1 of celluloid is cut into prisms 2 along the lines indicated in Figure 1 by a knife or a saw or other suitable mechanism, a knife being preferred so that no material is wasted. When so cut, each prism appears as indicated in Figure 6. Such a prism is then placed in a die 3 with a circular bore 4 and centered therein, it being preferable that the edges of the prism should touch the walls of the bore 4. This insures centering and keeps the prism 2 in the proper position for the operation which will now be described. Thereafter a die 5 driven by a suitable plunger or ram or other means, not shown, is forced down the longitudinal axis of the prism 2 as indicated in Figures 2 and 3, whereby the celluloid is shaped as shown in Figure 7 and the material is expanded radially, so that the mottled effect is preserved without distortion. The tube 6, so formed, is then ready for further treatment, and by having the walls of the bore 4 highly polished, a corresponding high polish is given to the exterior surface of the cylinder 6, so that all turning is unnecessary. The centre hole is so large that no boring is necessary so that the blank 6 is formed without waste.

In the modification shown in Figures 8 and 9, instead of a prism 2 which has a square cross section, a prism 7 is employed with a ractangular cross section and the plunger 8 is given a corresponding shape, the die 3 with its bore 4 remaining the same as before. When the die 8 is shoved down the same as the die 5, the blank 7 is changed into a cylinder like the cylinder 6.

While I have shown and described some embodiments of my invention, it is obvious that it is not restricted thereto but that it is broad enough to cover all structures which come within the scope of the annexed claims.

Having thus described my invention, what I claim is:

1. The method of making celluloid tubes from blocks of celluloid without waste which consists in severing the block into prims and thereafter expanding each prism radially so as to form an opening therein.

2. The method of making celluloid tubes from blocks of celluloid without waste which consists in severing the block into prisms and thereafter expanding each prism radially and against a polished surface so as to form an opening therein, and have an exterior polished surface.

3. The method of making tubes from rods, which consists in forming a rod and thereafter expanding the rod radially so as to form a tube without distorting any mottled effect of the rod.

4. The method of making tubes from blocks of thermoplastic material without waste which consists in severing the blocks into prisms and thereafter expanding each prism radially so as to form an opening therein.

5. The method of making tubes from blocks of thermoplastic material without waste which consists in severing the blocks into prisms and thereafter expanding each prism radially and against a polished surface as to form an opening therein, and have an exterior polished surface.

6. The method of making articles of complete or partially tubular shape which consists in forming a rod and thereafter expanding the rod radially so as to shape the rod without distorting the general mottled or other surface appearance initially present in the rod.

7. The method of making articles of partially tubular shape from blocks of thermoplastic material which consists in severing the blocks into prisms and thereafter expanding each prism radially so as to form an opening therein without distorting the general mottled, striped, checked or other appearance of the material as it appeared when in the block.

8. The method of making articles of celluloid or of material of like characteristics, into tubular form, consisting in inserting a prism of the material to be shaped within a smooth-walled cylinder and expanding the prism radially therein by pressure to form an opening in the prism and cause the prism to conform in shape to the internal shape of the cylinder.

9. The method of making thermoplastic articles of tubular form, consisting in inserting a thermoplastic prism within a cylinder of such diameter that the corners of the prism touch the walls of the cylinder, and expanding the prism radially within the cylinder to form an opening in the prism and cause the prism to conform to the internal shape of the cylinder.

In testimony whereof, I have hereunto set my hand this 12 day of August, 1930.

EVARTS G. LOOMIS.